United States Patent [19]

Baumgarten

[11] 4,423,825
[45] Jan. 3, 1984

[54] STEAM PRESSURE COOKING POT

[75] Inventor: Gerd D. Baumgarten
Wilnsdorf-Wilden, Fed. Rep. of Germany

[73] Assignee: Heinrich Baumgarten KG Eisen-und Blechwarenfabrik, Neunkirchen, Fed. Rep. of Germany

[21] Appl. No.: 441,150

[22] Filed: Nov. 12, 1982

[51] Int. Cl.³ .................................... B65D 45/00
[52] U.S. Cl. ................................ 220/316; 220/361; 220/367
[58] Field of Search ............. 220/202, 203, 208, 209, 220/316, 367, 368, 360, 361

[56] References Cited

U.S. PATENT DOCUMENTS

| 4,024,982 | 5/1977 | Schultz | 220/316 |
| 4,162,741 | 7/1979 | Walker et al. | 220/316 |
| 4,257,394 | 3/1981 | Zabel | 220/316 |
| 4,330,069 | 5/1980 | Baur | 220/316 |
| 4,343,325 | 8/1982 | Fallon | 220/316 |
| 4,396,130 | 8/1983 | Robinson | 220/316 |

Primary Examiner—Joseph M. Moy
Attorney, Agent, or Firm—Flynn, Thiel, Boutell & Tanis

[57] ABSTRACT

A steam pressure cooking apparatus includes a connectible pot and lid with respective radially projecting handles thereon, the lid handle lying above the pot handle when the pot and lid are interconnected. A pressure discharge valve is provided in the lid and is controlled by a cam surface on a knob rotatably supported on the lid handle. A cam plate rotated by the knob has a further cam surface thereon which controls a spring-biased locking slide supported on the lid handle and engageable with a cam on the pot handle to prevent relative movement of the handles.

14 Claims, 9 Drawing Figures

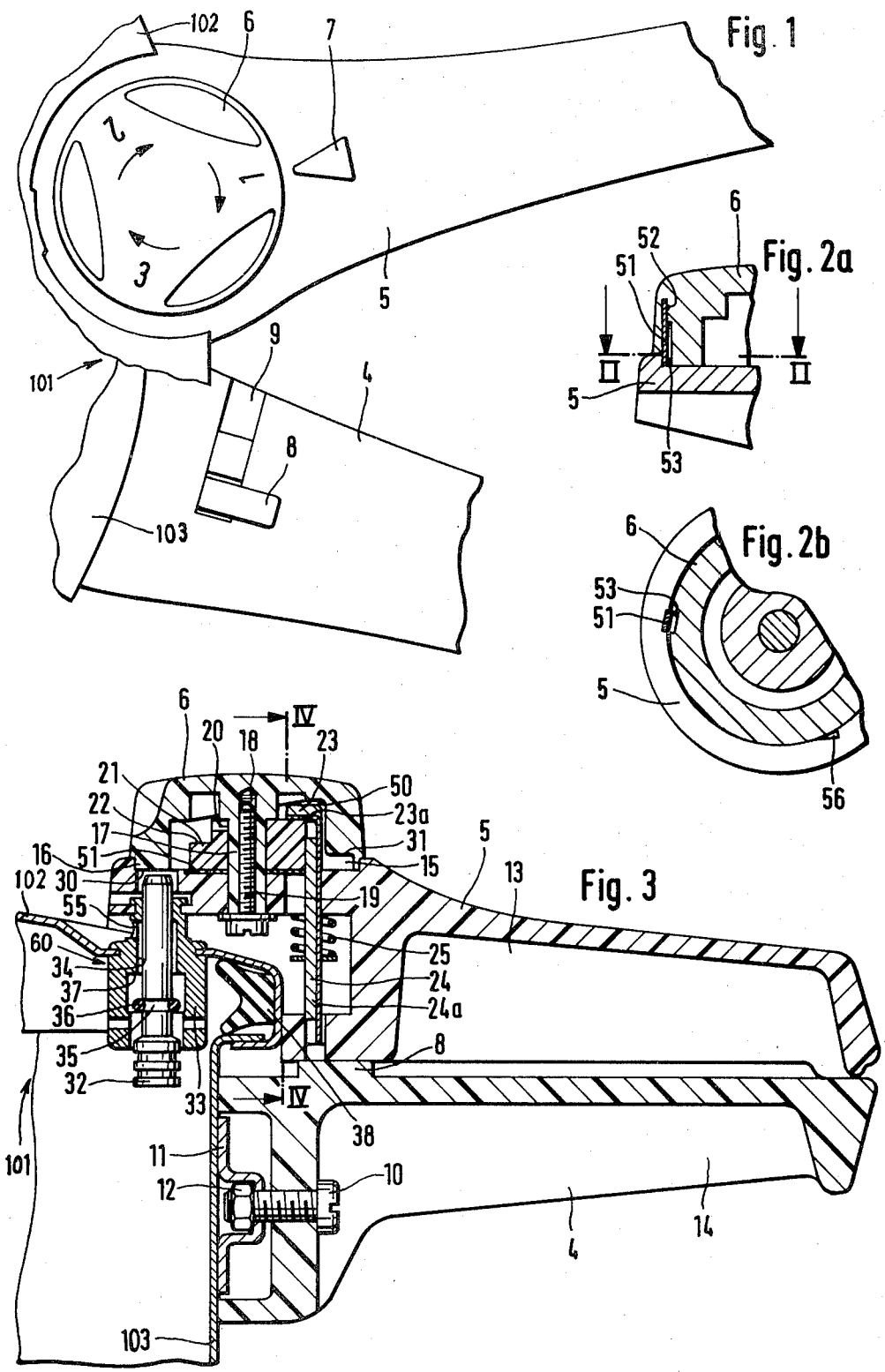

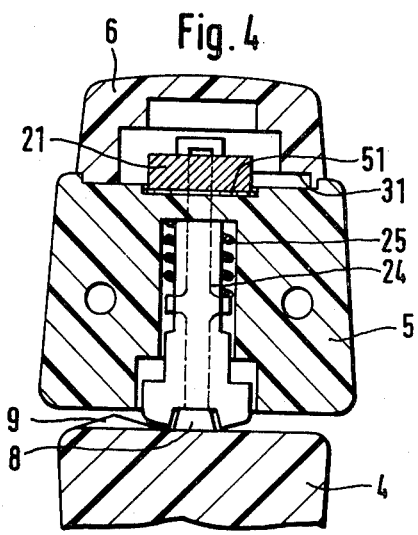
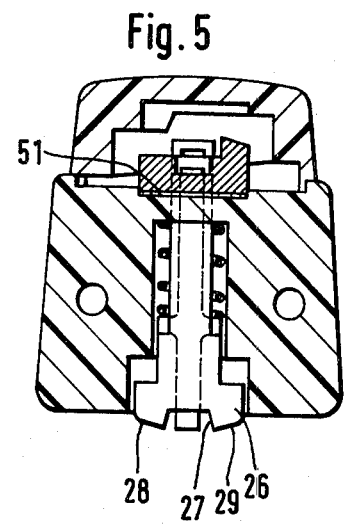
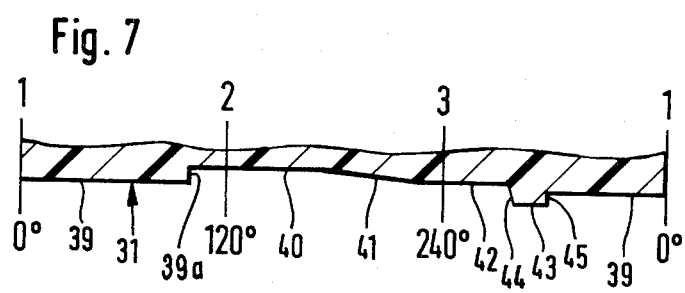
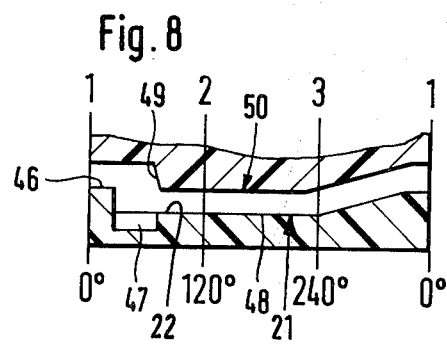
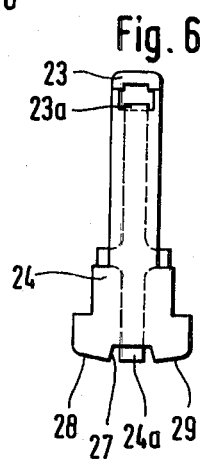

STEAM PRESSURE COOKING POT

FIELD OF THE INVENTION

This invention relates to a steam pressure cooking apparatus.

BACKGROUND OF THE INVENTION

The invention relates to a steam pressure cooking apparatus in which the lid can be locked tightly with the pot with the interpositioning of a seal ring through a bayonet connection, including respective radially projecting handles secured on the lid and on the pot and arranged to lie one above the other in the closed position, a pressure limiting valve and a discharge valve which can be closed by an overpressure inside the steam pressure cooking pot.

The basic purpose of the invention is to provide a steam pressure cooking pot of the above-mentioned type in which pressure cannot be built up when the handles do not lie one directly above the other and in which the steam pressure cooking pot cannot be opened as long as an overpressure is built up therein.

SUMMARY OF THE INVENTION

This purpose is attained inventively by the handle which is secured on the lid being provided with a control knob which extends inwardly at least over a portion of the lid edge, by the discharge valve being mounted below the control knob on the lid, by the movable plunger of the discharge valve being movable between a lower blow-off position and an upper closed position, by the plunger resting directly or indirectly on an annular cam surface which is constructed on the control knob and effects different positions of the discharge valve, namely a cooking, a blow-off and an open position, and by a further annular cam surface being coupled with the control knob and slidably supporting a spring-biased locking slide, the free end of which cooperates with a cam of the handle on the pot.

In a steam pressure cooking pot according to the invention, the plunger of the discharge valve rests on a cam surface which is constructed on the control knob and limits the possibility of movement of the plunger in an upward direction. The cam surface is divided into three sections, of which one section determines the cooking position of the valve, a second the blow-off position and a third the open position of the valve.

According to a further suggestion of the invention, cams are arranged in the cam surface and permit only one direction of rotation of the control knob. On a further cam surface on a cam plate which is provided in the same control knob there rests a two-part locking slide which is spring-biased and the lower end of which, in dependence on the angular position of the cam plate, projects more or less out of the handle which is secured on the lid. This handle lies in the closed position above a further handle which is mounted on the pot. The cam surface for the locking slide and the one for the discharge valve are adjusted in such a manner to one another that closing of the steam pressure cooking pot, building up of pressure and opening of the steam pressure cooking pot can occur only under certain conditions, as this will be discussed later on in connection with the exemplary embodiment.

A rotation of the knob from the evaporation position into the cooking position when the lid is removed is prevented through engagement of a locking member, which is arranged on the locking slide, in a recess of the cam surface for the locking slide. A complementary cam surface with a stop is arranged in the control knob and prevents an arbitrary lifting of the locking slide, so that the control knob remains blocked. Only when the steam pot is closed and the handles are positioned exactly one above the other is the locking member lifted from the recess of the cam plate by the cam on the pot handle, so that the control knob can now be rotated into the position "cooking". Thus, care is taken that pressure can be built up in the pot only after the proper closed position has been reached.

BRIEF DESCRIPTION OF THE DRAWINGS

One exemplary embodiment of the invention will be described in greater detail hereinafter in connection with the drawings, in which:

FIG. 1 is a top view of a portion of the inventive steam pressure cooking pot handles, FIGS 2a and 2b are respectively a sectional side view and a sectional top view of a ratchet arrangement in the pot handle of FIG. 1, FIG. 2b being taken along line II—II of FIG. 2a, FIG 3 is a fragmentary longitudinal cross-sectional view of the pot of FIG. 1 with the handles disposed one above the other, FIG. 4 is a cross-sectional view taken along the line IV—IV of FIG. 3 in the closed position, FIG. 5 is a cross-sectional view similar to FIG. 4 but in the open position, FIG. 6 is an illustration of the locking slide for the handles of FIG. 1 and of an associated locking member, FIG. 7 is a view of a cam surface for the discharge valve, and FIG. 8 is a view of a cam surface and complementary cam surface for the locking slide which locks the handles.

DETAILED DESCRIPTION

FIG. 1 illustrates a portion of a steam pressure cooking pot which as a whole is identified with reference numeral 101, the lid 102 of which cooking pot is placed on a pot 103. A handle 4 is mounted on the pot 103 and a handle 5 is mounted on the lid 102, which handles are constructed in the exemplary embodiment as stem handles. FIG. 1 illustrates the relative position of the handles at which the lid 102 can be removed from the pot 103 or can be placed onto the pot 103. The two handles 4, 5 lie one above the other in the closed position.

A control knob 6 is rotatably supported on the handle 5 which is secured on the lid 102, which control knob has three switching positions respectively labeled 1-3. A mark 7 on the handle identifies the selected position of the control knob.

A cam 8 is provided on the handle 4 which is secured on the pot 103, which cam 8 is positioned to lie along the path of swing of the control knob 6 on the handle 5. Furthermore, the handle 4 has an inclination 9 thereon adjacent cam 8, the function of which will be discussed hereinafter. The handle 4 is, as can be seen from FIG. 4, secured on the pot 103 by means of a screw 10. The screw 10 engages a nut 12 which is provided in a plate 11 which is riveted in a conventional and not illustrated manner to the pot 103. The handle 4 and the handle 5 are provided with respective cavities 13, 14 in order to save material.

A circular recess 15 is provided in the top surface of the handle 5, into which recess is inserted the lower edge of control knob 6, which is provided with a flange 16. With the help of the flange 16 and the recess 15, the control knob 6 is fixed against lateral or downward movement. The control knob 6 has furthermore a central, downward projection 17 which has a central tap hole 18. The control knob 6 is secured rotatably to the handle 5 by means of a screw 19 and a washer. By means of a tooth system 20, an annular cam plate 21 encircling projection 17 and control knob 6 are operatively coupled and rotate together. A cam surface on the cam plate is annular and identified with reference numeral 22. A bent end 23 of a locking slide 24 and a bent end 23a of a locking member 24a slidably rest on the cam surface 22 of the cam plate 21. The bent end 23a of the locking member 24a is urged against the cam surface 22 of cam plate 21 by a helical compression spring 25 which encircles the slide 24 and member 24a and has its ends engaging a downwardly facing surface of the handle 5 and laterally projecting flanges on the member 24. The bent end 23 of the locking slide 24 is guided between the cam surface 22 of the cam plate 21 and a complementary cam surface 50 on the control knob 6, the cam surface 50 being generally parallel to cam surface 22, as shown in FIG. 8. The lower end 26 of the locking slide 24 is shaped as shown by FIGS. 4 and 5, and has a recess 27 and furthermore two sloped edges 28, 29. The recess 27 is shaped like the cam 8 and has the purpose to prevent in the cooking position, namely in the position in which the locking slide 24 is lowered, movement of the handles 4, 5 relative to one another and in this manner to prevent opening of the pot 101.

On the bottom surface 30 of the hat-shaped control knob 6 there is constructed a further annular cam surface 31 on which rests the upper end of a plunger 32 of a pressure discharge valve 60.

The plunger 32 is vertically movably supported in a bore 34 of a valve housing 33 which is tightly secured in an opening through the lid 102. An annular groove 35 is provided on the plunger 32, in which annular groove is held a seal ring 36. This seal ring, when the steam pressure cooking pot 101 is pressurized, engages a valve seat 37, so that an overpressure can be built up in the steam pressure cooking pot 101. The plunger 32 can, however, only assume this closed position if the cam surface 31 assumes a very certain position with respect to the plunger 32.

To seal off the pot 103 and the lid 102 of the steam pressure cooking pot 101, a seal ring 38 is provided which is constructed in a conventional manner and rests on the pot 103 just like the lid 102.

FIG. 7 illustrates the cam surface 31 for controlling the discharge valve 60 and FIG. 8 illustrates the cam surfaces 22 and 50 for controlling the locking slide 24 and locking member 24a. The angular association of these cam surfaces, which about rotation of the control knob 6 are adjusted synchronously, is indicated in degrees and also by the numbers 1, 2 and 3, which correspond to the three labeled knob positions in FIG. 1.

The cam surface 31 in FIG. 7 has an opening/closing section which is identified with reference numeral 39 and corresponds with the position 1 of the control knob 6 (FIG. 1). A section 40 which follows the section 39 of the cam surface 31 permits a substantial further lifting of the plunger 32. This section of the cam plate corresponds with the cooking position and is position 2 of the control knob 6. An inclined section 41 follows the section 40, which inclined section 41 transfers into a section 42 which is vertically higher than the section 39. Between the sections 42 and 39 there is a cam 43 which has a sloped area 44 on one side, while the other side of the cam 43 is provided with a vertical surface 45.

FIG. 3 illustrates the control knob 6 in the opening/closing position 1. The plunger 32 is in its lowermost position, whereby its upper end lies only slightly under the section 39 of the cam surface 31. An overpressure cannot be built up in the pot 101 in this position. This is the position in which the lid 102 can be removed from the pot 103 or placed onto the pot 103.

The next possible position of the control knob 6, rotated clockwise, is thus the position 2 and corresponds with the section 40 of the cam surface 31. In this position the plunger 32 can be lifted by steam pressure which is produced in the pot 101 sufficiently far that the seal ring 36 will rest on the valve seat 37. An overpressure can now be built up in the pot. This position is the cooking position.

The vertical edge 39a of the cam surface 31 between the section 39 and the section 40 prevents, when an overpressure exists in the steam pot 101, rotation of the control knob 6 from the cooking position 2 back into the opening position 1, in that the plunger 32 hits the existing shoulder 39a. When the cooking operation is supposed to be ended, the control knob is rotated on into the position 3 by means of clockwise rotation, which causes according to the section 41 of the cam surface 31 the plunger 32 to be moved downwardly. Through this a blowing-off of steam is made possible. In this position 3 the plunger 32 is moved downwardly by the cam surface 31 but only a small amount. A stream of steam is then guided through the lid from the inside through the bore 34 and a steam outlet opening 55. The control knob 6, however, cannot be moved to the position 1 as long as a residual pressure exists in the steam pressure cooking pot 101. Only after the pressure has been completely removed from the pot does the plunger 32 fall to the position illustrated in FIG. 3. Now the distance of the upper end of the plunger 32 from the section 42 of the cam surface 31 is sufficiently large so that the cam 43 can be rotated past the plunger 32. A sufficient clearance exists between cam 43 and the upper plunger surface so that in the case of an undesired steam formation a pressure cannot build up. This corresponds with the cam section 39, which even at a full heating performance prevents a pressure build-up due to a sufficient cross-sectional size of the steam outlet through the valve member 33 and the outlet opening 55. A turning back of the control knob 6 from position 3 into position 2 is possible at any time.

During heating up in the position of the control knob 6 in which the plunger 32 is between cam 43 and opening position 1, also a turning back is prevented through a hitting of the plunger 32 on the cam 43.

The cam surface 22 is rotated synchronously with respect to the cam surface 31, on which cam surface 22 the bent ends 23 and 23a of the locking slide 24 and of the locking member 24a are pressed by the spring 25. The cam surface 50 additionally narrows down the movement. In the opening/closing position 1 the ends 23 and 23a of the locking slide 24 and of the locking member 24a rest on the section 46 of the cam surface 22. This section 46 is elevated, so that the slide 24 and member 24a assume their uppermost positions, namely the position in which the cam 8 no longer engages the recess 27 of the locking slide 24. Opening and closing of the steam pressure cooking pot is thus possible in this position. Between the position 1 and the position 2 (cooking position) of the control knob 6 there is provided a pocket 47 in the cam surface 22, which only the bent end 23a of the locking member 24a can engage. The end 23 of the locking slide 24 remains at the height of the cam section 48. This makes rotating ahead or rotating back of the control knob 6 impossible. The pocket 47 serves to make a pressure build-up in the steam pressure cooking pot 101 impossible when the two handles 4 and 5 during closing of the lid 102 are not properly positioned one above the other, but still have such an angular spacing between one another that the locking slide 24 does not rest on the handle 4 and member 24a does not engage the top of cam 8. This could for example be a position, in which the bayonet lock is only partially engaged. In this position the locking member 24a does not rest on top of cam 8 and therefore prevents the control knob 6 from being moved completely into the position 2, namely into the cooking position in which the discharge valve 60 closes and an overpressure can be built up in the pot 101. If, however, the steam pressure cooking pot 101 is closed correctly, namely the handles 4 and 5 are one above the other, then it is possible to further rotate the control knob 6 because the upper ends 23 and 23a of the locking slide 24 and member 24a, which upper ends slide on the cam surfaces 22 and 50, will be positioned so that they both lie at the vertical level of the cam section 48. Thus the control knob 6 can then be rotated into the cooking position 2. A stop surface 49 above the cam surface 22 serves to prevent a pressure in the steam pressure cooking pot from building up when the handles rest substantially but not exactly above one another. This is the case, when the recess 27 in the end 26 of the locking slide 24 does not properly engage the cam 8, but is shifted laterally thereto. In this case then the sloped area 28 or 29 will either rest on the cam 8 or on the sloped area 9 on the handle 4, which is provided for easy lifting of the locking slide 24 during relative movement of the handles 4 and 5. With the help of the cam surface 22, locking slide 24 and the locking member 24a, which cooperates with the handle 4, it is thus assured that a pressure in the steam pressure cooking pot can only build up when pot 103 and lid 102 are in the predetermined position with respect to each other which is shown in FIGS. 3 and 4.

During a further rotation of the control knob 6 from the cooking position 2 into the discharge position 3, the upper handle 5 and the lower handle 4 remain engaged by means of the locking slide 24. Only upon reaching the opening position 1 is the locking slide 24 lifted such that the cam 8 becomes free. The assurance that the control knob cannot be rotated directly into the opening position until all pressure is discharged is, as earlier described, the cam 43. A turning back of the control knob 6 from the opening position into the evaporation or discharge position 3 in the pressureless condition is prevented by a platelike retaining spring 51 (FIG. 2a), which is secured in a slot 53 of the control knob 6 by means of its upper end 52. As shown in FIGS. 2a and 2b, the retaining spring 51 cooperates with suitable recesses 56 in the peripheral edge of the circular recess 15 of the handle 5 in a ratchetlike manner, such that a rotation of the control knob 6 is only possible in the clockwise direction. The only exception to this limitation is that counterclockwise rotation is possible from the cooking to the evaporation position.

Thus an inventive steam pressure cooking pot is distinguished by a safety locking mechanism which does not permit a build-up of pressure in the steam pressure cooking pot when the handles are not exactly in the predetermined position. It furthermore does not permit opening when the steam pressure cooking pot is under pressure, and furthermore an opening during evaporation with a residual overpressure in the pot is also not possible. The stream of steam is guided during evaporation out of the pot interior through the lid. Thus the locking mechanism permits use of the steam pressure cooking pot without any danger. Moreover, through the integration of the locking mechanism into the handle on the steam cooking pot, a simple design which thus is inexpensive to manufacture is assured.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a steam pressure cooking pot, in which the lid can be releasably secured to the pot with the interpositioning of a seal ring, preferably by a bayonet connection, including respective radially projecting handles which are secured on the lid and on the pot and which are arranged one above the other in the closed position, including if desired a pressure limiting valve and including a discharge valve which can be closed by overpressure in the steam pressure cooking pot, the improvement comprising wherein the handle which is secured on the lid is provided with a control knob which preferably extends at least partially radially inwardly over the lid edge, wherein the discharge valve is mounted, preferably below the control knob, on the lid and the movable plunger of the discharge valve can be moved between a blow-off position and a closing position, wherein the plunger rests directly or indirectly on an annular first cam surface which is constructed on the control knob, wherein the cam surface in connection with the control knob permits various positions of the plunger in the discharge valve, namely a cooking, a blow-off and an open position, wherein with the control knob there is associated a further annular cam surface which, like the first cam surface, is fixed against rotation with respect to the control knob and on which slides a spring-biased slide, the free end of which cooperates with the handle which is secured on the pot.

2. The pot according to claim 1, wherein the plunger of the discharge valve is rod-shaped, wherein the upper end of the plunger extends above the valve housing and wherein the length of the part of the plunger, which projects from the valve housing is dimensioned such that it will rest on the associated cam surface.

3. The pot according to claim 1, wherein the slide has a recess on its downwardly pointing end which in the cooking position engages a cam provided on the pot handle.

4. The pot according to claim 1, wherein the cam surface for the slide and its length are adjusted in such a manner to one another that a closing and opening of the pot under pressure is not possible, and also a pressure build-up is not possible when the handles do not lie exactly one above the other.

5. The pot according to claim 1, wherein the first cam surface is provided with a cam arranged between the blow-off position and opening position which forms a stop for the discharge valve plunger and permits a rotation of the control knob from the blow-off into the opening position only when a complete pressure reduction in the pot is achieved.

6. The pot according to claim 1, including a locking member which movably slides on the locking slide.

7. The pot according to claim 6, wherein an upper bent end of the locking member slides on the further cam surface.

8. The pot according to claim 6, including a pocket provided in the further cam surface between the opening and the cooking position, which pocket cooperates with the locking member of the locking slide.

9. The pot according to claim 8, wherein above the further cam surface there is arranged a stop, which lies between the opening and the cooking position of the control knob and after the pocket.

10. The pot according to claim 1, wherein a sloped or inclined area is provided on the pot handle.

11. The pot according to claim 10, wherein the end of the locking slide is provided with a sloped area, which cooperates with the sloped area of the pot handle.

12. The pot according to claim 1, wherein the first cam surface for the discharge valve is integral with the lower edge of the hat-shaped control knob.

13. The pot according to claim 1, wherein above the first cam surface there is arranged at a predetermined distance and extending generally parallel to said first cam surface a complementary cam surface.

14. The pot according to claim 6, wherein both the locking slide and also the locking member are urged by a spring against the first cam surface.

* * * * *